United States Patent [19]

Arimoto

[11] Patent Number: 4,888,492

[45] Date of Patent: Dec. 19, 1989

[54] IMAGE READING APPARATUS

[75] Inventor: Shinobu Arimoto, Tokyo, Japan

[73] Assignee: Canon Kabushiki Kaisha, Tokyo, Japan

[21] Appl. No.: 162,302

[22] Filed: Feb. 29, 1988

[30] Foreign Application Priority Data

Mar. 3, 1987 [JP] Japan .................................. 62-47962
Mar. 3, 1987 [JP] Japan .................................. 62-47966

[51] Int. Cl.⁴ .............................................. H01J 40/14
[52] U.S. Cl. .................................... 250/578; 358/163; 382/54
[58] Field of Search ................ 250/205, 578; 358/163, 358/280, 282, 293, 294; 382/50, 54

[56] References Cited

U.S. PATENT DOCUMENTS 4,675,533 6/1987 Shimizu ............................. 250/578
4,691,365 9/1987 Nagashima ........................... 382/54

Primary Examiner—David C. Nelms
Assistant Examiner—Stephone B. Allen
Attorney, Agent, or Firm—Fitzpatrick, Cella, Harper & Scinto

[57] ABSTRACT

An image reader capable of uniform image signal output, in which the output signal obtained by reading an image of a reference document with an image reading device and the output signal obtained by reading a reference member with the image reading device are maintained at a constant ratio, and the ouput obtained by reading an original image is corrected according to the above-mentioned ratio.

21 Claims, 14 Drawing Sheets

IMAGE READING APPARATUS

BACKGROUND OF THE INVENTION

1. Field of the Invention

The present invention relates to an image reading apparatus for reading an image in the unit of each pixel, and more particularly to an image reading apparatus provided with an illuminating light source.

2. Description of the Related Background Art

There is already known an image reading apparatus, for use in a facsimile apparatus or a digital copying machine, in which an original image is illuminated by a light source such as a fluorescent lamp and the intensity of the light reflected from said original image is detected for example by a CCD image sensor to obtain a photoelectrically converted electric signal.

In such apparatus, the intensity of the illuminating light source affects the resulting image signal and has therefore to be regulated to an optimum value.

The assignee of the invention has already proposed, in U.S. Pat. No. 4,677,287, U.S. Pat. No. 4,679,073, U.S. application Ser. No. 614,239 etc., a method of light regulation for such image reading apparatus, in which a standard white board as the standard for the white level and is disposed outside an original reading area, and in which regulation of the power supply to the light source is carried out in such a manner that the signal read from said white board constitutes a reference white signal.

The output signal of a CCD image sensor, obtained by reading an image of uniform density, may not be uniform, due to uneven luminocity of the light source, transmission characteristic of the lens or uneven sensitivity of the CCD image sensor. Such a phenomenon is called shading.

The assignee of the present invention has also proposed in the above-mentioned U.S. application Ser. No. 614,239, U.S. Pat. No. 4,675,533, U.S. application Ser. No. 706,179 etc., to correct such shading by electrically correcting the image signal obtained from the original image, based on an output obtained by reading a standard white board of a uniform density with the CCD image sensor.

In such an apparatus having the light regulating function and the shading correcting function, a standard white board is often used for both functions.

However such a standard white board is inevitably expensive since the white level thereof, particularly that of a reflective density lower than 0.1, is difficult to maintain in manufacturing. Besides, even if such a standard white board is incorporated in an apparatus with a well controlled white level, it becomes impossible to assure the white level of the output image and to achieve optimum light regulation and shading correction, due to discoloration or smear caused by temperature, humidity, dust contained in the cooling air, and infrared or ultraviolet light from the illuminating system.

SUMMARY OF THE INVENTION

In consideration of the foregoing, an object of the present invention is to provide an image reading apparatus capable of satisfactory light regulation or shading correction for the image reading.

Another object of the present invention is to provide an image reading apparatus capable of satisfactory light regulation or shading correction sufficiently responsive to the density change of a reference member used as a reference for such light regulation or shading correction.

Still another object of the present invention is to provide an image reading apparatus capable of constantly providing a uniform image signal.

The foregoing and still other objects of the present invention, and the advantages thereof, will become fully apparent from the following description.

DETAILED DESCRIPTION OF THE PREFERRED EMBODIMENTS

Now the present invention will be clarified in detail by description of the preferred embodiments thereof.

First Embodiment

Figure 1:
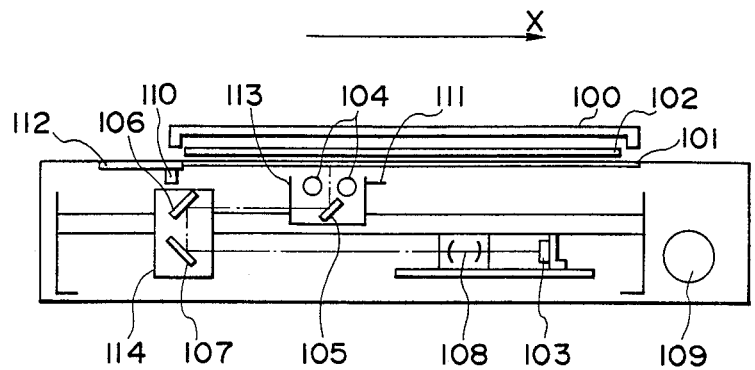
FIG. 1 is a cross-sectional view of an image reading apparatus.

FIG. 1 is a schematic view of an original reading apparatus embodying the present invention. For reading the image information of an original 102 placed on a support glass plate 101 and maintained in place by an original cover 100, there is employed an image sensor 103 such as a CCD, having plural photosensor elements arranged in the main scanning direction. The light from a light source 104 illuminates the original 102, and the light reflected therefrom is guided through mirrors 105, 106, 107 and is focused by a lens 108 onto the image sensor 103. An optical unit 113 consisting of the light source 104 and the mirror 105, and another optical unit 114 consisting of the mirrors 106, 107 are driven with a relative speed ratio of 2:1. Said optical unit 113 is moved by a DC servo motor 109 at a constant speed under a phase locked loop control, with a constant speed which is variable from 22.5 mm/sec to 360 mm/sec according to the image magnification in the forward movement from left to right, but is fixed at 800 mm/sec in the reverse movement from right to left.

One scanning operation is completed by moving said optical unit from a home position at the left-hand end to a predetermined position at the right and returning it to said home position, while the image sensor 103 reads the image with a resolving power of 400 dots/inch in a main scanning direction (Y-direction) perpendicular to the moving direction of said optical unit or the sub scanning direction (X-direction).

The entire original image is thus read line by line. The presence of the optical unit at the home position is detected by a home position sensor 110 composed of a photointerruptor whose light beam is intercepted by a light shield plate 111. A standard density board 112 is used for shading correction and for light intensity control of the illuminating light source 104, and is read when the home position is detected by the sensor 110.

Figure 2:
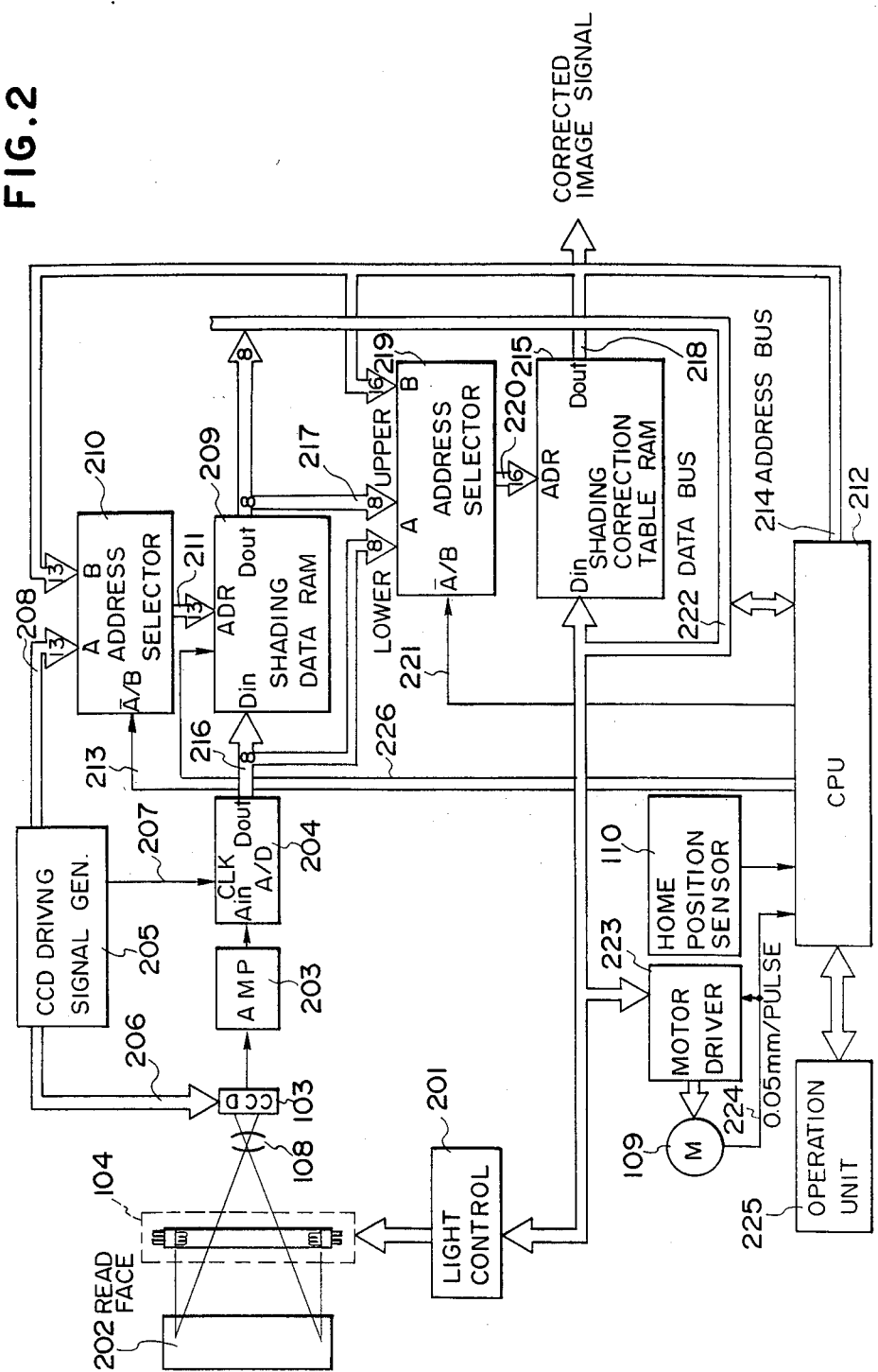
FIG. 2 is a block diagram of a signal processing circuit thereof.

FIG. 2 is a block diagram of an example of an image processing section used in the original reading apparatus shown in FIG. 1.

The light source 104 in the present embodiment is composed of a fluorescent lamp whose light emission is regulated by a light control unit 201 with a high-frequency lighting time control method utilizing a thyristor or the like.

A reading face 202, bearing density information reflecting the light from the light source 104 and read by the CCD line sensor 103, is composed either of the standard density board 112 or the original 102 shown in FIG. 1, according to the movement of the optical unit.

The analog image signal of each line, obtained by the CCD 103, is amplified by an amplifier 203 and is converted, by an A/D converter 204, into a multi-level digital image signal 216 (8 bits per pixel in the present embodiment).

In the present embodiment the black level and the white level of the original are respectively read as "0" and "255". A standard black level and a standard white level of the A/D converter 204 are given fixed values, and the offset value of the amplifier 203 is so regulated that the A/D converter provides a signal "0" representing a complete black level, when the light source 104 is completely turned off so that the CCD 103 does not receive light.

A CCD drive signal generator 205 generates CCD drive signals 206 required for driving the CCD 103, such as a reset signal, a clock signal and a horizontal synchronization signal; a clock signal 207 for the A/D converter 204; and a CCD address signal 208 for identifying the bits of the CCD 103. In the present embodiment the CCD 103 is composed of a line sensor of 5,000 pixels, so that the CCD address counts up from 0 to 4999 corresponding to the 5,000 pixels read in synchronization with the horizontal synchronization signal.

A shading data RAM 209 is provided for storing all the pixel data the digital image signal of two lines from the A/D converter 204, and either one of said two lines is selected by a bank switch signal 226 from a CPU 212.

An address selector 210 selects an address signal 211 supplied to the shading data RAM 209, and switches a CCD address 208 and a CPU address from an address bus 214 of the CPU in response to an address switch signal 213 from the CPU 212.

A shading correction table RAM 215 constitutes a table for correcting the unevenness in the image signal 216, resulting from the unevenness in light intensity caused by the light source 104 or the lens 108, unevenness in the photosensitivity of the pixels of the CCD 103, and errors in the gain of the amplifier 203. Correction table data are written into said table RAM 215 by the CPU 212 prior to an original reading operation, and, in said reading operation, the unevenness in the image signal 216, obtained by reading the original, is corrected to obtain a corrected image signal 218 by addressing the correction table RAM 215 with the shading data 217 from the shading data RAM 209 and with the read image signal 216.

An address selector 219, for the address 220 to be given to the shading correction table RAM 215, selects a CPU from address bus 214 or an address synthesized from the read image signal 216 and the shading data 217, in response to an address switch signal 221 from the CPU 212.

A motor driver 223, for controlling the forward and reverse motion of an optical system driving motor 109 and the speed thereof, receives data on the forward and reverse motion and on the speed from a data bus 222 of the CPU 212, and controls the rotation of the DC servo motor 109 under a phase locked loop control utilizing an encoder pulse signal 224 received from and synchronized with the rotation of said motor 109. Said encoder pulses 224 are also given to the CPU 212, which detects the scanning position of the optical system by counting said pulses. The home position sensor 110, composed of a photointerruptor, is fixed in a reading area of the standard density board 112, and said standard density board is read by the CCD 103 as the reading face when the light shield plate 111 fixed to the light source 104 is detected at the position of the home position sensor 110.

The CPU 212 is composed of a microcomputer incorporating a ROM storing a control program, a working RAM, an arithmetic unit etc. and executes sequence control of the present embodiment, image data correction, light intensity control of the light source, and control of the operation unit 225.

Figure 3:
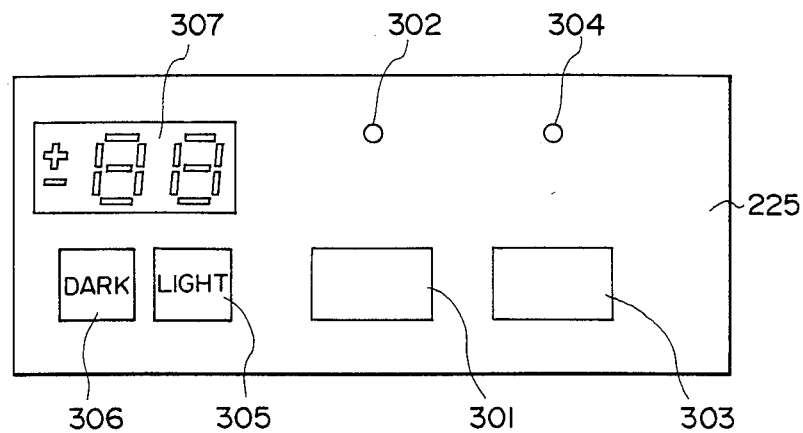
FIG. 3 is an external view of an operation unit controlled by a CPU 212.

FIG. 3 shows the details of the operation unit 225, which receives the key inputs and shows displays under the control of the CPU 212. There are provided a key 301 for starting a light regulation value measuring mode; an LED (light emitting diode) 302 indicating that said mode is in progress; a key 303 for starting a mode of reading the original 102 placed on the support glass plate 101; an LED 304 indicating that said mode is in progress; a key 305 for increasing the light intensity from the measured value in response to which a display 307 indicates an increase in the light regulation value, and a key 306 for decreasing the light intensity from the measured value in response to which the display 307 indicates a decrease in the light regulation value.

The unit of indication of the light regulation value by the display unit 307 is equal to the amount of least significant bit of the A/D converter 204. The value thus displayed is stored in a memory with a back-up battery in the CPU 212 even when the power supply to the apparatus is turned off, and is displayed again when the power supply is restarted.

The present embodiment explained above has two operating modes; one being the light regulation value measuring mode in which the light source 104 is so controlled that the image signal 216 obtained by reading an original of a controlled reflective density becomes constant and the image signal 216 from the standard density board 112 is measured with such light intensity; and the other being an original reading mode in which the light source 104 is so controlled that the image signal obtained by reading the standard density board 112 becomes equal to the value measured in said light regulation value measuring mode and then the original 102 on the support plate 101 is read by scanning to obtain a shading-corrected image signal 218.

These two operating modes will be explained in the following.

Light Regulation Value Measuring Mode

Figure 4:
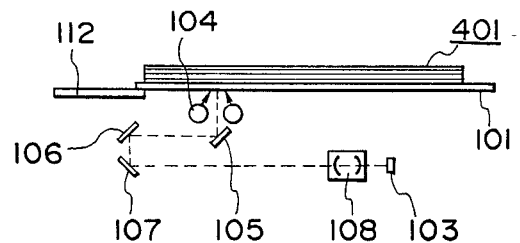
FIG. 4 is a schematic view showing the structure for light regulation.

As a preparation for the light regulation value measuring mode, an original 401 with a controlled reflective density is placed, as shown in FIG. 4, on the support glass plate 101. In the present embodiment, there are employed, as said original 401 of controlled reflective density, 10 plies of A3-sized standard white paper, for example that of a controlled reflective density of 0.07, immediately after the package is opened. Consequently such original has a reflective density of about 0.07 and can be considered as standard white.

Figure 5:
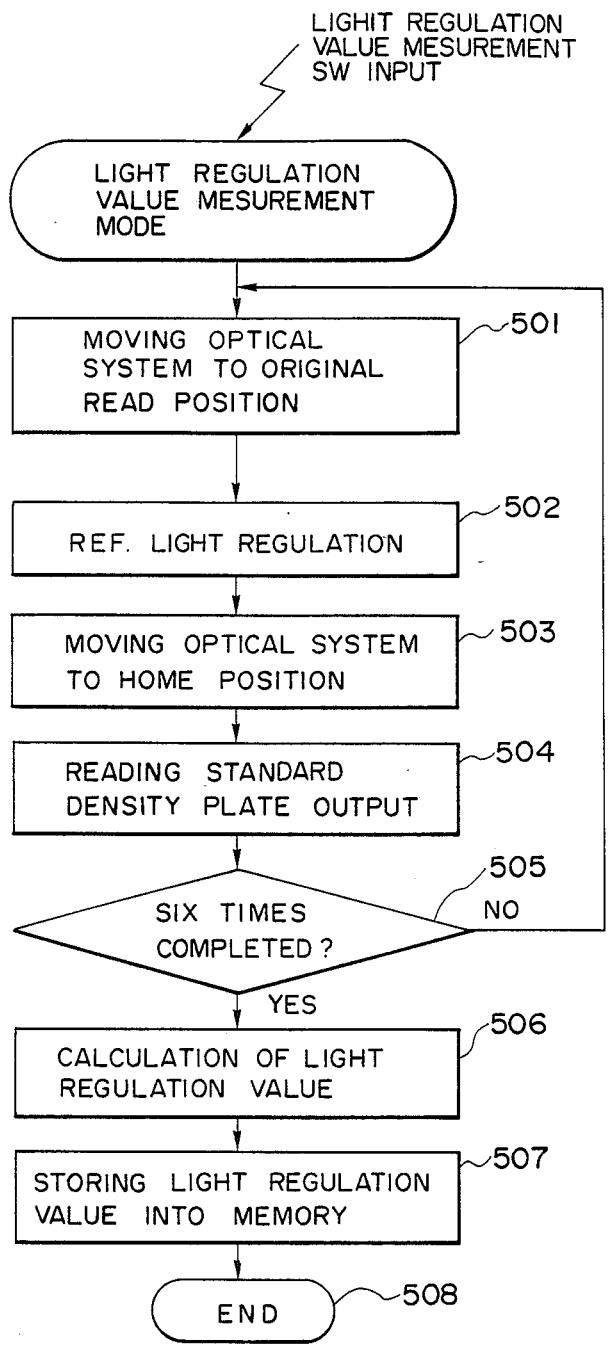
FIG. 5 is a flow chart of a light regulation value measuring mode.

After such preparation, the operator turns on the light regulation value measuring switch 301, whereby the CPU 212 turns on the indicator 302 and the light regulation value measuring mode is processed as shown in FIG. 5.

At first a step 501 CPU 212 moves the optical unit 113 from the position of the home position sensor 110 for 10 cm toward the original, so that said original 401 placed on the support glass plate 101 serves as the original reading face 202. In this operation the CPU 212 counts 2,000 encoder pulses from the driving motor 109 to determine the stopping position of the optical system, in which each pulse represents a moving distance of 0.05 mm.

Then, in a step 502, CPU 212 turns on the light source 104 and so regulates the intensity thereof that the output 216 of the A/D converter becomes equal to "240" (basic light regulation). The standard white is not set at the full-range output "255" of the A/D converter in order to resolve an original of a reflective density lower than 0.07 and in order to provide a range of 16 levels of light regulation at the lighter side, thereby preventing the use of a saturated output state of the A/D converter and achieving exact basic light regulation. In the present embodiment the target value of light regulation is selected at the level "240" because the output of the A/D converter is of 8 bits, but said target value can be suitably selected according to the resolving power of the A/D conversion.

The shading data RAM 209 is used for reading the output 216 of the A/D converter by the CPU 212.

At first, the input A of the address selector 210, or the CCD address 208, is selected as the address of the shading data RAM 209. Then the data of light intensity of a scanning line of CCD read from the standard white original at a certain light intensity are recorded in the RAM 209.

Then the CPU 212 selects the input B of the address selector 210, or the address bus 214 of the CPU 212, as the address of the RAM 209, thereby reading the data stored in said RAM 209 through a bus 222 and thus measuring the data of light intensity.

The CPU 212 fetches the light intensity data from eight consecutive pixels at the center of the CCD line sensor 103 of 5,000 pixels, namely eight pixels from 2497th to 2504th, and determines the light intensity by averaging the data of said eight pixels. Then it increases or decreases the illumination intensity data to the light control unit 201 so as to that said light intensity data reach a level "240", repeating the data storage into and data reading from the RAM 209.

When an illumination intensity providing a light intensity data of the level "240" is determined, the illumination intensity is maintained at this level, and a step 503 moves the optical unit 104 to the position of the home position sensor. Then a step 504 reads the light intensity data corresponding to the standard density board 112, from the RAM 209.

The sequence from the step 501 to the step 504 is repeated 6 times by a step 505, whereby the light intensity data corresponding to the standard density board 112 is measured six times.

Then a step 506 removes the maximum and minimum values from the six light intensity data, and averages the remaining four data to determined a target light regulation value corresponding to the standard density board 112.

In the actual original reading operation, by maintaining the light intensity data of the light reflected from the standard density board 112 at said target value, an area of the original with a reflective density of 0.07 is already represented by a level "240" in the output of the A/D converter.

A step 507 stores said target light regulation value at a predetermined address of a nonvolatile memory with a back-up battery, and adds a code indicating the completion of storage. A subsequent step 508 turns off the indicator 302 and terminates the light regulation value measuring mode.

Said target light regulation value indicates the ratio of the amount of light reflected by the standard density board 112 to that reflected by the reference white original 401, so that the light regulation value measuring mode has to be executed when the standard density plate is replaced or the density thereof changes after a prolonged use.

Image Reading Mode

Figure 6:
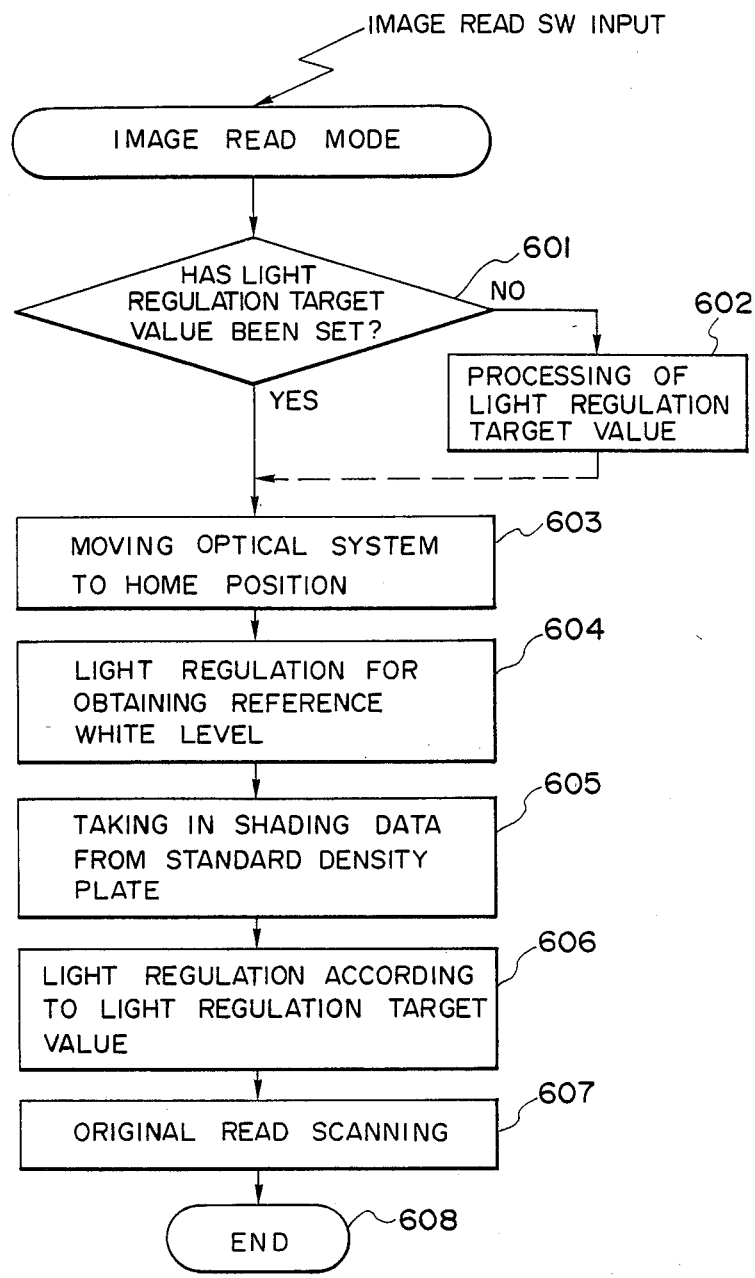
FIG. 6 is a flow chart of an original reading mode in a first embodiment.

FIG. 6 is a flow chart showing the control sequence in the image reading mode.

In response to the actuation of the image reading switch 303 of the operation unit 216, the CPU 212 turns on the indicator 304 indicating that the image reading operation is in progress.

Then a step 601 discriminates whether the target light regulation value has been set by the light regulation value measuring mode, based on the code indicating the completion of storage, to be written in the step 507 of the light regulation measuring mode.

If said target value has not been set, a step 602 flashes the indicator 304 and employs a pre-programmed fixed value as the target value. Said fixed value is selected at a most frequently encountered value in the manufacture of the standard density board.

After the target light regulation value is set at the target value determined in the light regulation value measuring mode or at said fixed value, a step 603 moves the optical unit 113 to the position of the home position sensor 110, in order to read the light reflected from the standard density board 112.

Then steps 604, 605 execute fetching of the shading data. The shading correction in the present embodiment is executed, regarding the shading data from the standard density board 112 as equivalent to those from the reference white original 401. For this purpose the light source 104 is so regulated that the maximum value of the read data 216 from the standard density board 112 coincides with the normalized value "240" from the reference white original 401.

For the purpose of this control, at first a step 604 stores the light intensity data read from the standard density board 112 illuminated with suitable illumination intensity data, into the shading data RAM 209 with the CCD address 208.

Then the CPU 212 addresses the shading data RAM 209 with the address bus 214 through the input B of the address selector 210, thereby fetching data from the RAM 209 and discriminating whether any of the data of addresses corresponding to all the bits of the CCD has reached the saturation level "255" of the A/D converter 204. If said saturation level "255" has been reached at any of the bits, the illumination intensity data supplied to the light control unit 201 are decreased, and the light intensity data read from the standard density board 112 are again stored in the shading data RAM 209 to conduct said discrimination again whether the saturation level has been reached. When it is confirmed that the saturation level has not been reached in any of the bits, there is identified a bit of maximum level (light regulation point). The above-explained procedure is called light regulation point search.

Then through similar data sampling and control of illumination intensity data, the light intensity is so controlled that the average value of eight consecutive pixels reaches the normalized light intensity data "240" of the reference white original.

In a subsequent step 605, the CCD 103 reads the standard density board 112 under such regulated light intensity, and the light intensity data from said CCD 103 are stored, as shading data from the reference white original, in a lower bank of the shading data RAM 209 (signal 226 at the low level).

Then a step 606 shifts the bank switch signal 226 to the high level state to effect light regulation, with the upper bank of the shading data RAM 209, in such a manner that the light intensity data from the standard density board becomes equal to the target light regulation value determined in the steps 601 and 602. More specifically the light regulation is conducted in such a manner that the average value of eight consecutive pixels, employed in the step 604 and containing the light regulation point, becomes equal to the target light regulation value.

A next step 607 uses again the lower bank of the shading data RAM 209, and shading correction for the read image signal 216 is conducted on the shading correction table RAM 215, utilizing the shading data written in a step 605, while the optical unit 113 is moved in the X-direction with a predetermined speed to read the original.

Figure 7:
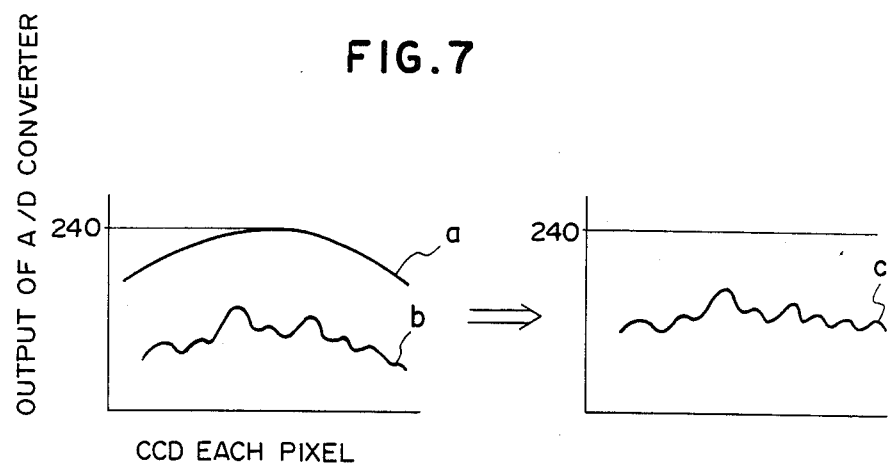
FIG. 7 is a schematic chart showing the concept of shading correction.

FIG. 7 schematically shows the principle of shading correction in the present embodiment, in which the abscissa corresponds to the pixels of the CCD 103, while the ordinate indicates the outputs of the A/D converter corresponding to said pixels. A curve a shows the shading characteristic corresponding to the reference white original sampled in the step 605, and the original image signal b read with this shading characteristic is released, by the shading correction, as a corrected image signal c. Since the output of the CCD 103 is proportional to the light intensity, correction is made according to the following formula:

$$c = 240/a \times b$$

wherein 240 is the normalized white level, and b is defined as $0 \leq b \leq 255$.

Figure 8:
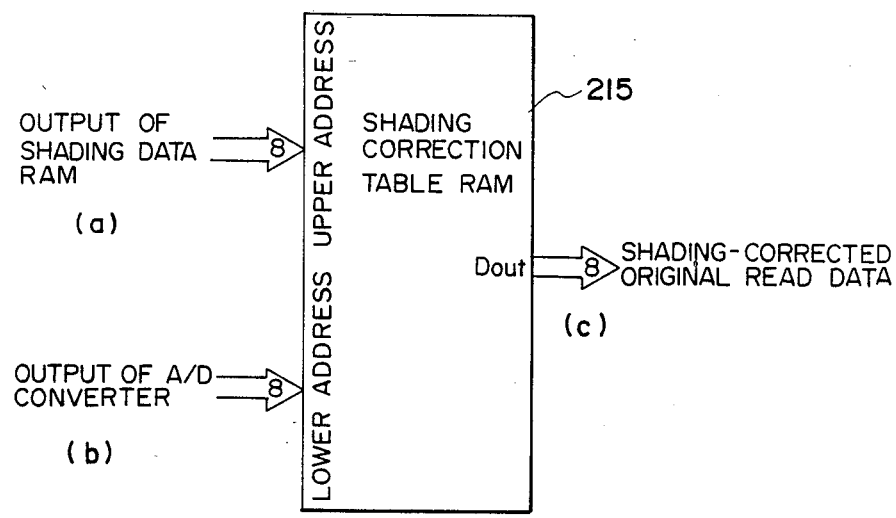
FIG. 8 is a block diagram showing inputs and outputs of a shading correction table RAM.

Correction data based on this formula are recorded in the shading correction table RAM 215 at the start of power supply to the apparatus. More specifically, as shown in FIG. 8, the shading correction table RAM 215 receives, at an upper address thereof, the shading characteristic a from the shading data RAM 209 in synchronization of the bits of the CCD, and, at a lower address thereof, the A/D converted output of the original image signal, and is so constructed as to release the corrected output c in response to the combination of said inputs a and b.

As explained in the foregoing, the present embodiment is capable of uniform original reading with density control from a reference black level to a normalized white level without shading, and the white level of the read image can be regulated by controlling the target light regulation value employed in the step 606 with the keys 305, 306 and the display 307 shown in FIG. 3. If the light regulation level at the original reading is selected larger than the value measured in the light regulation value measuring mode, the level of the reference white original increases so that the read image appears lighter, and vice versa.

The key 305 is used for elevating said level or making the image lighter, and the key 306 is used for lowering said level or making the image darker. In response to the key input, the CPU 212 turns on the display 307 in a unit of the minimum resolution of the A/D converter 204. The increase or decrease is associated with the display of a plus or minus sign.

In the step 602 of the present embodiment, if the target light regulation value has not been set, it is also possible not to execute the image reading operation but to warn the operator with a flashing display.

Also the present embodiment is not limited to the reading with a black-and-white signal but also to reading with a color signal if the standard density board reflects white light as white light of a certain density. Also said board may have a high reflectance for a particular wavelength.

Furthermore, if the change of the light regulation value is conducted based on the output of background density detecting means such as pre-scanning means, there can be achieved automatic skipping of blank image areas. In such case the automatic blank area skipping is rendered possible by conducting the pre-scanning with a predetermined light regulation value, preparing a histogram of the light intensity data in the vicinity of white level, determining the light intensity data from the background, and scanning the original after the target light regulation value A is so changed to a value A' that said light intensity data W assume the level 240 as indicated in the following equation:

$$A'/A = 240/W$$

Also as explained in the foregoing, the present embodiment enables the use of a white original of a relatively controlled density such as a handily available copy sheet to dispense with the strict density control of the standard density board used in the sampling of the data for light regulation and shading correction.

Also an intentional change in the light regulation value allows density control of the output signal without any additional circuit.

Furthermore the shading characteristic for a uniform density can be obtained with an unspecified density board, so that there can be dispensed with the shading correcting circuits for different densities or the correcting calculations for different densities.

In the foregoing embodiment, at the fetching of the shading data, the illumination intensity is so regulated that the maximum value of the data read from the standard density board 112 becomes equal to the normalized value "240" of the reference white original 401, in order to match the shading data from said standard density board 112 with those from said reference white original 401. Consequently a light regulating operation for fetching the shading a data and a light regulating operation for original reading are required at the home position.

In the following there will be explained a second embodiment capable of exact shading correction without separate light regulating operations for fetching the shading data and for reading the original image.

The second embodiment to be explained in the following is different from the first embodiment only in the software of the CPU 212 in the image reading mode, and the general structure of the image reading apparatus of the first embodiment shown in FIG. 1, the image signal processing block shown in FIG. 2 and the operation unit shown in FIG. 3 are the same in the second embodiment. These portions will not therefore be explained again, and the image reading mode in the second embodiment will be explained in the following.

Second Embodiment

Image Reading Mode

Figure 9:
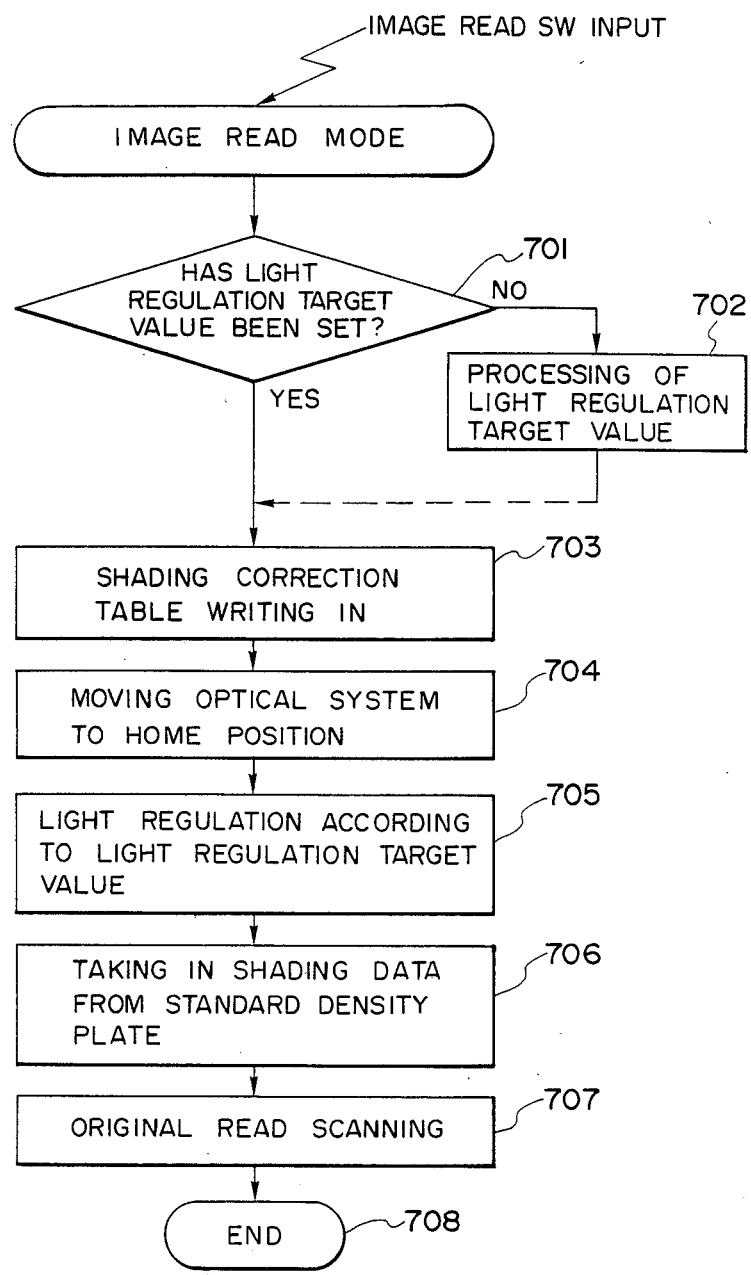
FIG. 9 is a flow chart of an original reading mode in a second embodiment.

FIG. 9 shows the flow chart in the image reading mode.

Upon detection of an input from the image reading switch 303 of the operation unit 216, the CPU 212 turns on the indicator 304 indicating that the image reading operation is in progress.

Then a step 701 discriminates whether the target light regulation value has been set by the light regulation value measuring mode, based on the code indicating the completion of storage, written in the step 507 of the light regulation measuring mode. If said target value has not been set, a step 702 flashes the indicator 304 and employs a pre-programmed fixed value as the target value. Said fixed value is selected at a most frequently encountered value in the manufacture of the standard density board.

After the target light regulation value is set at the target value determined in the light regulation value measuring mode or at said fixed value, a step 703 executes data writing in the shading correcting table RAM 215.

In the present embodiment, based on a principle of assuring the reference white level of the original by taking the reflected light intensity data from the standard density board 112 as the target light regulation value, the shading correction is conducted in such a manner that the output of each pixel of the CCD line sensor obtained by reading the standard density board 112 becomes equal to the target light regulation value.

Figure 10:
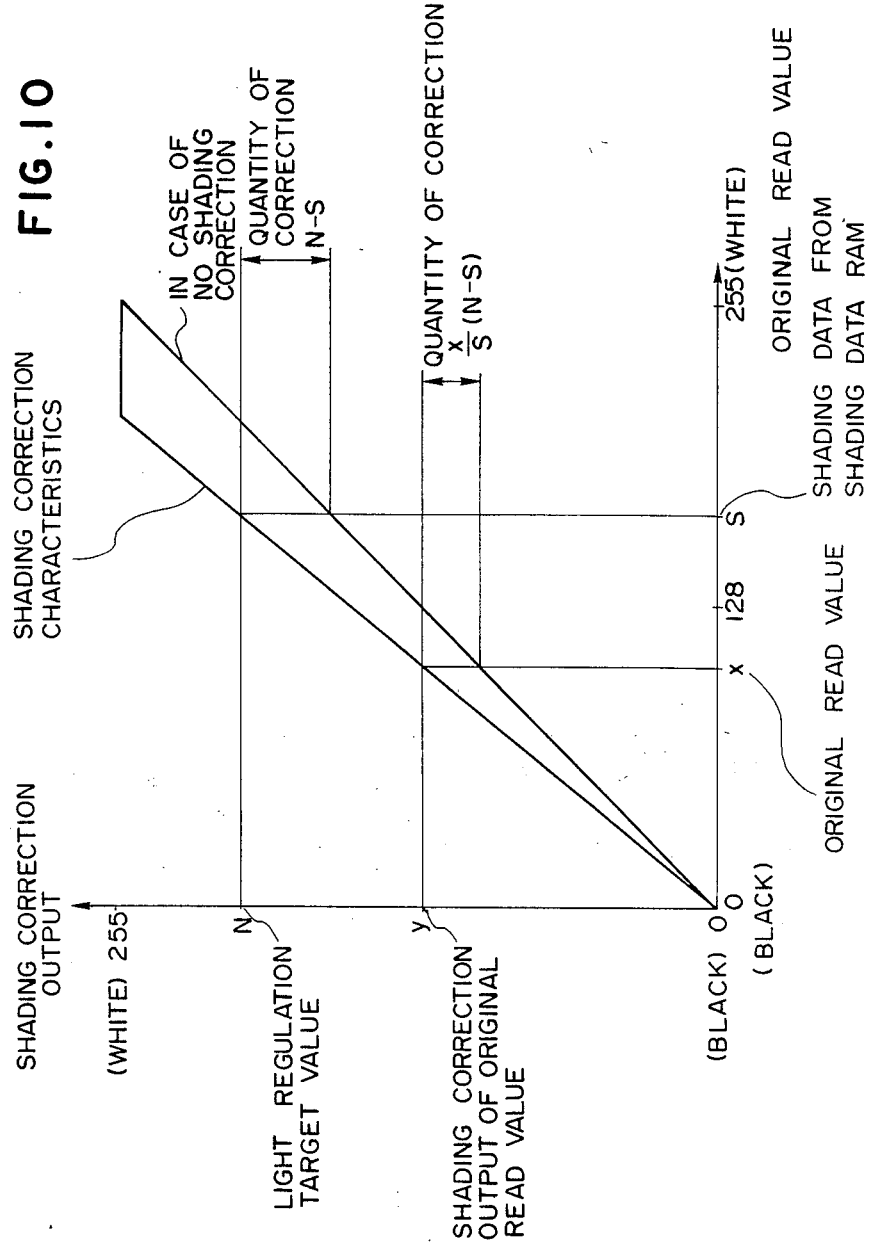
FIG. 10 is a chart showing the principle of shading correction.

FIG. 10 shows the principle of shading correction.

In FIG. 10, the shading correction is conducted on a certain pixel of the CCD 103 with an output S obtained by reading the standard density board 112, to obtain the target light regulation value N. The abscissa indicates the A/D converted output before correction, and the ordinate indicates the shading corrected value.

In a without the shading correction, the relation between the input and the output is represented by a line having an angle of 45°. This means an addition of a correction value (N−S) to the pixel with the output S corresponding to the standard density board 112. Since the output of the CCD line sensor 103 is proportional to the light intensity, the correction value for an original image signal is represented by $$\frac{x}{S}(N-S).$$

Consequently the corrected output is represented by:

$$y = x + \frac{x}{S}(N-S) \begin{cases} y = 0 \text{ if } y \leq 0 \\ y = 255 \text{ if } y \geq 255 \end{cases}$$

Figure 12:
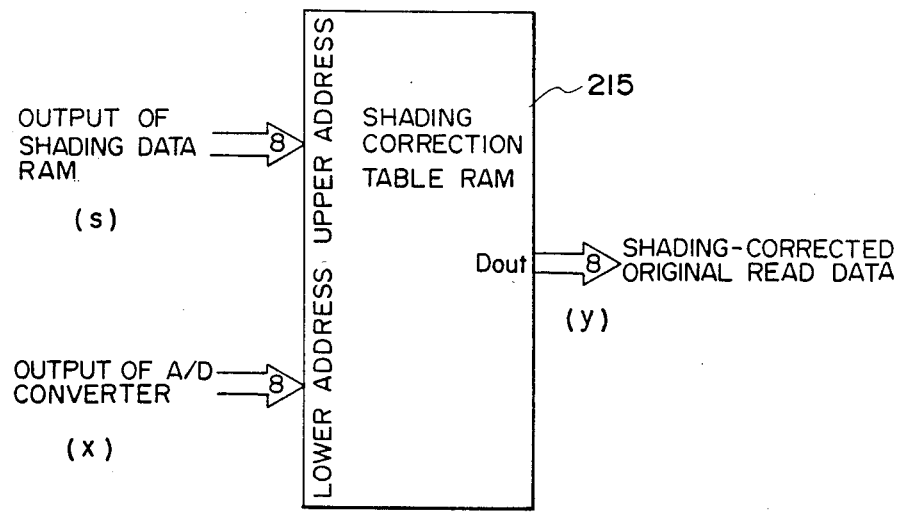
FIG. 12 is a block diagram showing inputs and outputs of a shading correction table RAM.

The shading correction table RAM 215 providing such corrected value is constructed as shown in FIG. 12, and receives the shading data S of the standard density board at the upper address and the original signal read at such shading state at the lower address.

In a step 703, the CPU 212 selects the input B of the address selector 219, calculates the corrected outputs y in all combinations of the shading data S and the read original signal x, utilizing the target light regulation value N determined in the step 701 or 702, and stores the thus calculated results in the shading correction table RAM 215. Thereafter the input A of the address selector 216 is selected.

Then, in a step 704, the CPU 212 regulates the light intensity of the light source 144 to the target light regulation value, and moves the optical unit 113 to the position of the home position sensor 110, in order to read the shading data S from the standard density board 112 with the CCD 103.

Then a step 705 turns on the light source 104 and regulates the light intensity in such a manner that the maximum value of the image signal of a line read from the standard density board becomes equal to the target light regulation value N.

For this purpose, the light intensity data read from the standard density board 112 illuminated with suitable illumination intensity data are stored in the shading data RAM 209, with the CCD address 208.

Then the CPU 212 connects the address bus 214 to the shading data RAM 209 by selecting the input B of the address selector 210, thereby fetching data from said RAM 209 and discriminating whether the saturation level "255" of the A/D converter has been reached in any of the data of all the bits of the CCD.

If said level "255" is reached at any of the bits, the illumination intensity data to be given to the light control unit 201 are decreased. Then the light intensity data read from the standard density board are stored again in the shading data RAM 209, and the discrimination is conducted again as to whether said saturation level has been reached. After it is confirmed that said saturation level is not reached in any of the bits, a bit of maximum level (light regulation point) is identified.

The procedure explained above is called the light regulation point search.

Then, through a similar data sampling operation and an illumination intensity data regulating operation, the light regulation is conducted in such a manner that the average of consecutive eight pixels, containing the light regulation point approximately at the center, becomes equal to the target light regulation value N.

A subsequent step 706 reads the standard density board 112 with the CCD 103 under such regulated light, and stores the obtained shading data S in the shading data RAM 209.

Then at a step 707, the CPU 212 supplies the shading data, read from the shading data RAM 209 in synchronization with the bits of the CCD, and the original image signal 216, respectively as the inputs S and x, to the shading correction table RAM 215 to obtain the shading corrected output signal 218, while moving the optical unit 113 at a predetermined speed in the X-direction, thereby scanning the original image.

Figure 11:
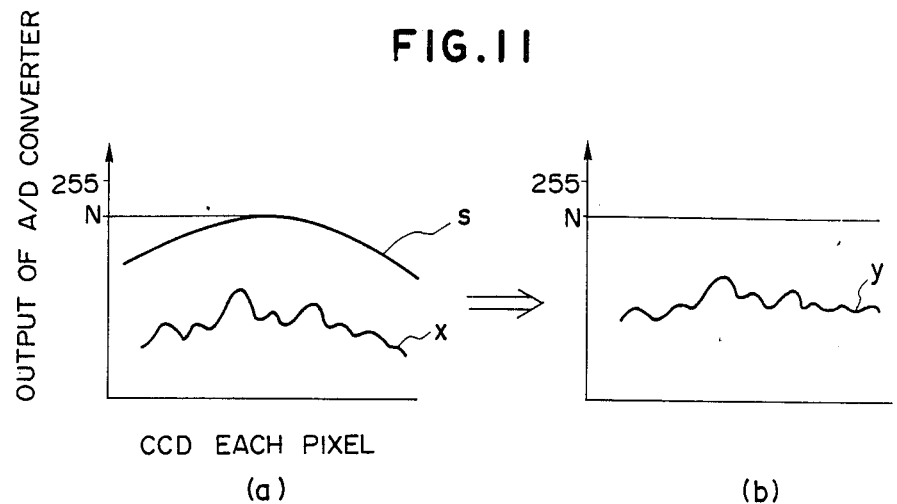
FIGS. 11 and 13 are schematic charts showing the principle of shading correction.

FIG. 11 shows the mode of shading correction in this state. Since the light regulation is conducted in such a manner, as shown in FIG. 11(a), that the maximum value of the shading data S from the standard density board 112 becomes equal to the target light regulation value N, the output signal from all the bits of the CCD obtained by reading the standard density board becomes uniformly equal to N as shown in FIG. 11(b) by means of the shading correction, so that the image signal x obtained by reading an original is corrected to a signal y free from shading.

Figure 13:
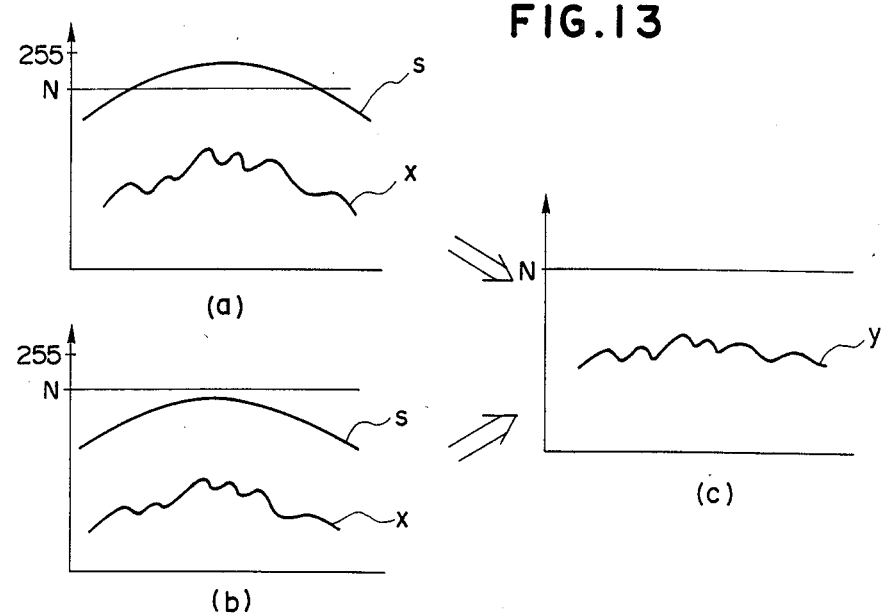

Even if the regulation of the illuminating system is not sufficient as shown in FIGS. 13(a) and 13(b) in storing the shading data S in the shading data RAM 209, information on the original of the same density as that of the standard density board 112 always reaches the target light regulation value N since the value read from said standard density board 112 is used as the shading data, and the original reading is conducted under the same condition of light regulation.

This is because the shading correction functions to assure the ratio of the density of the standard density board to that of the reference white original in the light regulation value measuring mode by means of digital signals as will be apparent from FIG. 10. Consequently the light regulation at the original reading can be conducted in a somewhat rough manner if the light regulation in the light regulation value measuring mode is conducted exactly and if the relationship between the densities of the reference white original and the standard density board is exactly measured as the target value N.

As explained in the foregoing, the present embodiment is capable of uniform original reading with density control from a reference black level to a normalized white level without shading, and the white level of the read image can be regulated by controlling the target light regulation value employed in the step 706 with the keys 305, 306 and the display 307 shown in FIG. 3. If the light regulation level at the original reading is selected larger than the value measured in the light regulation value measuring mode, the level of the reference white original increases so that the read image appears lighter, and vice versa.

The key 305 is used for elevating said level or making the image lighter, and the key 306 is used for lowering said level or making the image darker. In response to the key input, the CPU 212 turns on the display 307 in a unit of minimum resolution of the A/D converter 204. The increase or decrease is associated with the display of a plus or minus sign.

In the step 702 of the present embodiment, if the target light regulation value has not been set, it is also possible, instead of executing the image reading operation, to warn the operator with a flashing display.

Also the present embodiment is not limited to reading with a black-and-white signal but also to reading with a color signal if the standard density board reflects white as white light of a certain density. Also said board may have a high reflectance for a particular wavelength.

Furthermore, if the change of the light regulation value is conducted based on the output of background density detecting means such as prescanning means, there can be achieved automatic skipping of blank image areas. In such case the automatic blank area skipping is rendered possible by conducting the pre-scanning with a predetermined light regulation value, preparing a histogram of the light intensity data in the vicinity of the white level, determining the light intensity data from the background, and scanning the original after the target light regulation value N is so changed to a value N' that said light intensity data W assume the level 240 as indicated in the following equation:

$$N'/N = 240/W$$

The storage of the correction data into the shading correction table RAM 215 need not be conducted at each actuation of the image reading switch 303 but can be conducted only once at the start of power supply to the apparatus.

In the foregoing embodiment, the ratio of the density of a standard density board without strict density control to that of a reference white original is measured, and the shading correction at the original reading is so conducted as to maintain said ratio. Consequently the light regulation at the original reading can be made in a rough manner within a relatively short time. It is therefore possible to shorten the original reading time, to achieve uniform original reading with assured white density even in the presence of fluctuations in the illumination intensity and in the density of the standard density board, and to allow larger tolerances in the performance of the light control unit and in the density of the standard density board, thereby reducing the cost of the apparatus.

Third Embodiment

The light regulating operation at the original reading is not necessary if the light source 104 in the foregoing first or second embodiment is composed of an illuminating lamp with stable light intensity such as a halogen lamp. This is because, in case of a halogen lamp, the light intensity is strongly correlated with the lighting voltage so that a stable light intensity can be obtained by maintaining a lighting voltage. In the present embodiment, by employing such a light source in the image reading apparatus shown in FIG. 1, the correction for the density change of the standard density board 112 or for the fluctuation in density between the apparatus is conducted in the following manner. At first there is determined a density ratio D of the standard density board 112 to a reference white original placed on the original support glass plate. Secondly there is determined a value F by multiplying the reference white level E with said density ratio D. Thirdly, at the original reading, the shading correction is conducted in such a manner as to bring the originally read value x to y with a same proportion necessary for bringing the value H read from the standard density board 112 to said value F. For this purpose the apparatus of the present embodiment has two operating modes: one being a density ratio measuring mode for determining the relative density ratio D of the standard density board 112 to a reference white level; and the other being an original reading mode for obtaining the corrected image signal 218 by scanning the original 102 with the thus determined density ratio D.

These two operating modes will be explained in the following.

Density Ratio Measuring Mode

As a preparation for the density ratio measuring mode, an original 401 is placed on the support glass plate 101 as shown in FIG. 4. In the present embodiment, as in the first and second embodiments, there are employed 10 plies of A3-sized standard white paper as said original 401 of controlled reflective density, for example white paper of a controlled reflective density of 0.07, immediately after the package is opened. Consequently such original has a reflective density of about 0.07 and can be considered as standard white.

Figure 14:
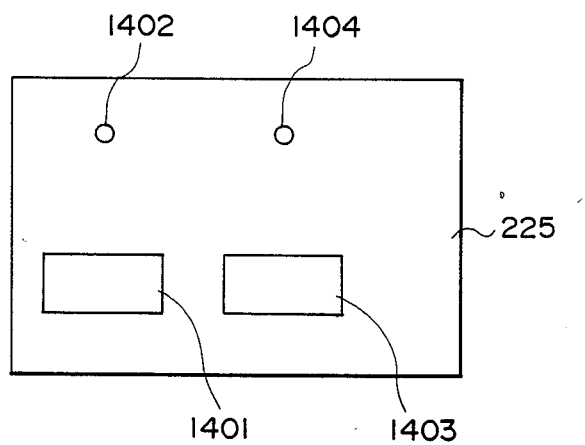
FIG. 14 is an external view of an operation unit in a third embodiment.
Figure 15:
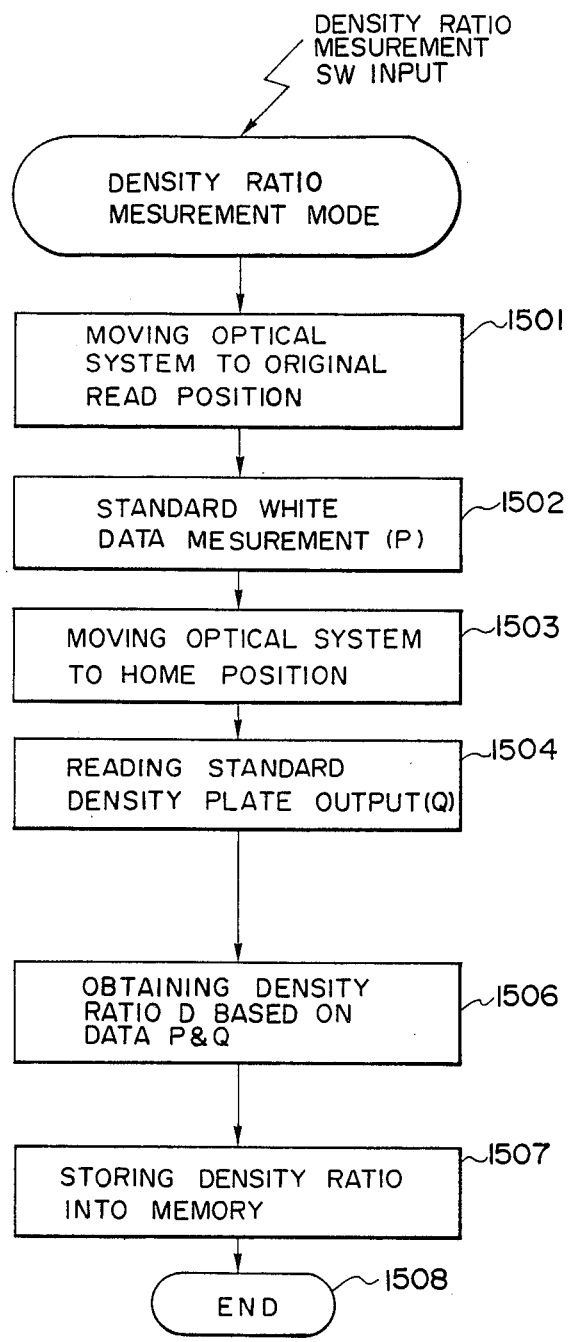
FIG. 15 is a flow chart of a density ratio measuring mode.

After such preparation, the operator turns on a density ratio measuring switch 1401 shown in FIG. 14, whereby the CPU 212 turns on an indicator 1402 indicating that the measurement of the density ratio is in progress, and executes the density ratio measuring mode shown in FIG. 15.

FIG. 14 shows the details of the operation unit 225 in the present embodiment, which executes key inputs and display under the control of the CPU 212. There are provided a key 1401 for starting the density ratio measuring mode; an LED 1402 indicating that the density ratio measuring mode is in progress; a key 1403 for starting an original reading mode for the original 102 placed on the support glass plate 101; and an LED 1404 indicating that the original reading mode is in progress.

FIG. 15 is a flow chart showing the control sequence of the CPU 212 in said density ratio measuring mode.

At first, in a step 1501, CPU 212 moves the optical unit 113 from the position of the home position sensor 110 for 10 cm toward the original, so that said original 401 placed on the support glass plate 101 serves as the original reading face 202. In this operation the CPU 212 counts 2,000 encoder pulses from the driving motor 109 to determine the stopping position of the optical system, in which each pulse represents a moving distance of 0.05 mm.

Then a step 1502 supplies illumination data to the light control unit 201, thereby lighting the light source 104 with a predetermined lighting voltage. The lighting voltage in this state can be determined in a relatively rough manner, as long as the maximum value of the A/D conversion output 216 obtained by reading the reference white original does not exceed the full-range output level "255". Therefore the light control unit 201 of the present embodiment is so constructed as to provide a constant lighting voltage to the light source 104 in response to the illumination data from the CPU 212. Under such a lighted state, the CPU 212 measures the light intensity data from the reference white original on the support glass plate, and the output of the A/D converter (measurement of reference white level).

The shading data RAM 209 is used for reading the output 216 of said A/D converter.

At first the CCD address 208 at the input A of the address selector 210 is used as the address for the shading data RAM 209, and the light intensity data of a scanning line of the CCD obtained by reading the reference white original under a certain illumination intensity are stored in the RAM 209.

Then the address bus 214 of the CPU 212 at the input B of the address selector 210 is selected as the address for the shading data RAM 209, and the CPU 212 measures the light intensity data by reading the data stored in said RAM 209.

In this operation the CPU 212 obtained the reference white data P by averaging the data of eight consecutive pixels at the center of the CCD line sensor 103 having 5,000 pixels, namely from 2497th to 2504th pixels.

When said reference white data P are determined, the illumination is maintained in this state, and a step 1503 moves the optical unit 104 to the position of the home position sensor, and a step 1504 reads the light intensity data, obtained from the standard density board 112, as the standard density board data Q from the RAM 209.

Then a step 1506 determines the density ratio D from the reference white data P and the standard density board data Q according to the following equation.

$$D = Q/P$$

In a step 1507, CPU 212 then stores said density ratio D in a predetermined address of a nonvolatile memory with a back-up battery, and adds a code indicating the completion of storage. Then a step 1508 turns off the indicator 1402, and the density ratio measuring mode is terminated.

Said density ratio D indicates the ratio of reflective densities of the standard density board 112 and the reference white original 401. Consequently said density ratio measuring mode has to be executed when the standard density board is replaced or the density thereof varies after prolonged use.

Image Reading Mode

Figure 16:
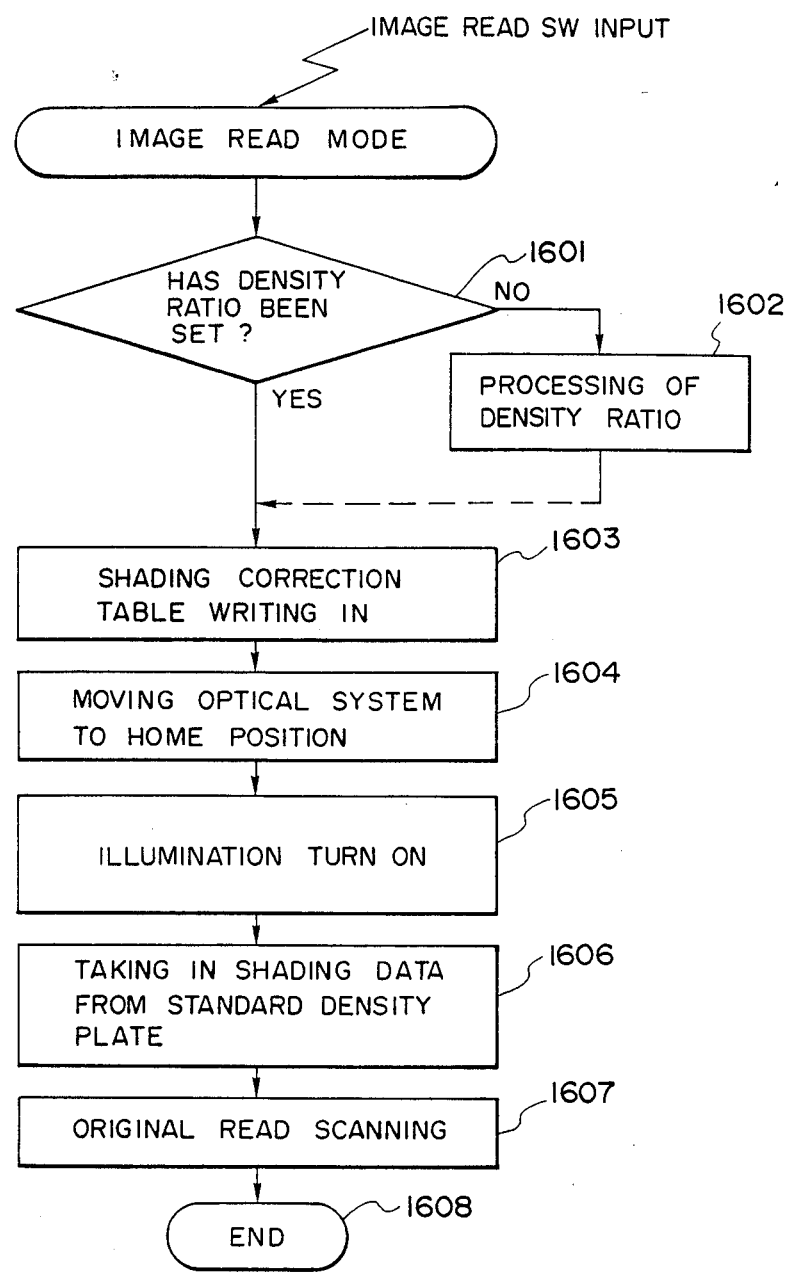
FIG. 16 is a flow chart of an original reading mode in the third embodiment.

FIG. 16 shows the flow chart of the image reading mode.

In response to an input from the image reading switch 1403 of the operation unit 216, the CPU 212 turns on an indicator 1404 indicating that the image reading mode is in progress.

Then, in a step 1601, the CPU 212 discriminates whether the density ratio D has been set by the density ratio measuring mode, based on the code indicating the completion of storage, to be written in the step 1507. If said density ratio D has not been set, the indicator 1404 flashes and a pre-programmed fixed value is employed as the density ratio D. Said fixed value is selected as a most frequently encountered density in the manufacture of the standard density board.

After the density ratio is set at the ratio measured in the density ratio measuring mode or at said fixed value, a step 1603 executes data writing in the shading correcting table RAM 215.

In the present embodiment, based on a principle of assuring the reference white level of the original by bringing the light intensity data reflected from the standard density board 112 to a product F (normalized level of the standard density board) of the reference white level E and the density ratio D, the shading correction is conducted in such a manner that the output of each pixel of the CCD line sensor obtained by reading the standard density board becomes equal to said normalized level F of the standard density board. In the present embodiment a level "240" is used as the reference white level E.

Figure 17:
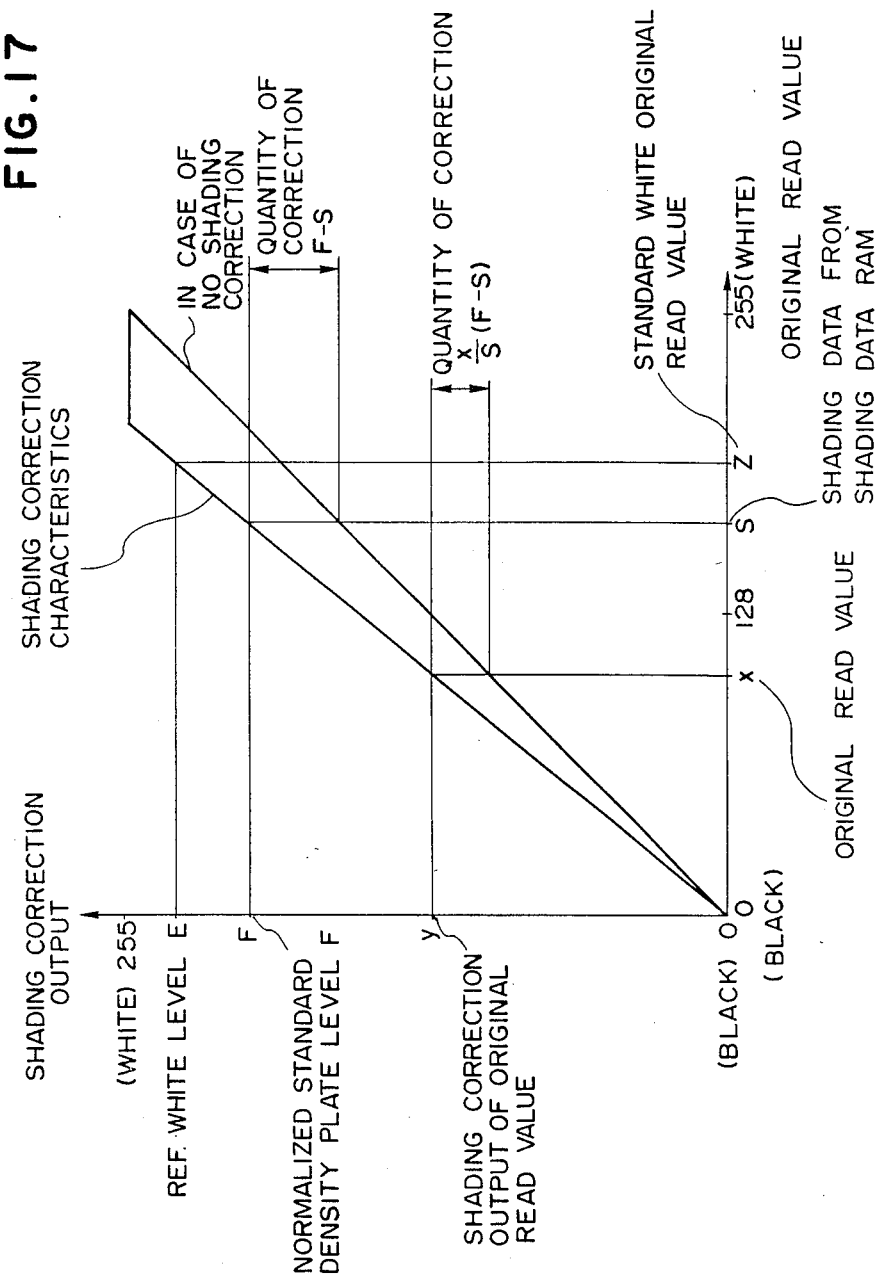
FIG. 17 is a chart showing the principle of shading correction.

FIG. 17 shows the principle of shading correction.

In FIG. 17, the shading correction is conducted on a certain pixel of the CCD with an output S obtained by reading to the standard density board, to obtain a normalized level F. The abscissa indicates the A/D converted output before correction, and the ordinate indicates the shading corrected value.

In case the shading correction is not conducted, the relation between the input and the output is represented by a line having an angle of 45°. This means an addition of a correction value (F−S) to the output S corresponding to the standard density board. Since the output of the CCD line sensor 103 is proportional to the light intensity, the correction value for an original image signal is represented by $$\frac{x}{S}(F - S).$$

Consequently the corrected output is represented by:

$$y = x + \frac{x}{S}(F - S) \begin{cases} y = 0 \text{ if } y \leq 0, \\ y = 255 \text{ if } y \geq 255. \end{cases}$$

Since there stands a relation Z =S/D wherein Z is the signal obtained by reading the reference white original, or E =F/D, the correction can be made in the following manner:

$$y = \frac{S}{D} + \frac{S}{DS}(F - S) = E.$$

The shading correction table RAM 215 providing such corrected value is constructed as shown in FIG. 12, and receives the shading data S of the standard density board at the upper address and the original signal read under such shading state at the lower address.

Thus, in a step 1603, the CPU 212 selects the input B of the address selector 219, calculates the corrected outputs y in all the combinations of the shading data S and the read original signal x, utilizing the normalized level F of the standard density board, and stores the thus calculated results in the shading correction table RAM 215. Thereafter the input A of the address selector 216 is selected.

Then the CPU 212 moves the optical unit 113 to the position of the home position sensor 110, in order to read the shading data S from the standard density board 112.

Subsequently a step 1605 turns on the light source 104, and a step 1606 stores the shading data S obtained from the standard density board 112 under such illumination state into the shading data RAM 209.

Then a step 1607 supplies the shading data 217, read from the shading data RAM 209 in synchronization with the bit output of the CCD and the original image signal 216, respectively as the inputs S and x, to the shading correction table RAM 215 to obtain the shading corrected output 218 therefrom, while scanning the original by moving the optical unit 113 in the X-direction at a predetermined speed.

Figure 18:
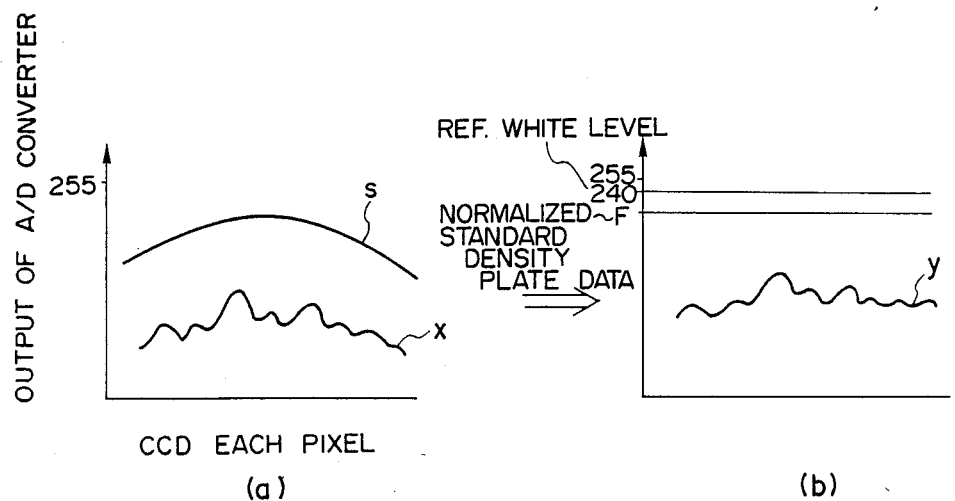
FIG. 18 is a schematic view showing the principle of shading correction.

FIG. 18 shows the principle of shading correction in this operation. The shading data S from all the bits of the CCD corresponding to the standard density board are changed, as shown in FIG. 18(b), to the uniform normalized data F, and the original image signal x is corrected to a signal y without shading.

If a reference white original with a density 0.07 is placed on the support glass plate, the obtained signal is corrected, by the shading correction, to the reference white level "240".

As explained in the foregoing, the present embodiment is featured by determining the density ratio D of the standard density board to the reference white level, then multiplying said density ratio D with the reference white level E to obtain a normalized level F of the standard density board, and executing the shading correction with the thus obtained value F, and is therefore capable of uniform original reading, in which the signal obtained from the reference white original is released as the reference white level E, even with an illuminating system without light regulation.

Even when the density level of the standard density board changes, uniform original reading is possible by measuring the density ratio D again.

Although the present invention has been explained by the preferred embodiments thereof, it is not limited to such embodiments and is subject to various modifications and variations within the scope and spirit of the appended claims.

I claim:

1. An image reading apparatus comprising:
   reading means for photoelectrically reading an original image and generating an image signal;
   a reference member for use in the measurement of fluctuations in the output of said reading means;
   detecting means for detecting a ratio of the output of said reading means obtained by reading a reference document having a predetermined reference density to the output of said reading means obtained by reading said reference member; and
   correcting means for correcting the fluctuation of an image signal obtained by reading an original document with said reading means, utilizing the output signal obtained by reading said reference member with said reading means;
   wherein said correcting means is adapted to correct the fluctuation in the image signal taking into account the ratio detected by said detecting means.

2. An image reading apparatus according to claim 1, further comprising a light source for illuminating an image to be read by said reading means.

3. An image reading apparatus according to claim 1, further comprising storage means for storing the output signal obtained by reading said reference member with said reading means, and wherein said correcting means corrects the fluctuation utilizing the output signal stored in said storage means.

4. An image reading apparatus according to claim 1, wherein the reference document comprises a pure white paper.

5. An image reading apparatus according to claim 1, wherein said detecting means comprise holding means for holding the output value of said reading means obtained by reading the reference document.

6. An image reading apparatus according to claim 1, wherein said correcting means comprises memory means for outputting a corrected image signal in response to addressing by the output signal of said reading means obtained by reading said reference member, and by the output signal obtained by reading said original document.

7. An image reading apparatus according to claim 6, wherein data for correcting fluctuations stored in said memory means, are determined taking into account the ratio detected by said detecting means.

8. An image reading apparatus comprising:
reading means for photoelectrically reading an image and generating an image signal;
a reference member for use in the measurement of fluctuations in the image signal output by said reading means;
detecting means for detecting the difference between the output value of said reading means obtained by reading said reference member and a reference value corresponding to a reference density; and
correcting means for correcting the fluctuation of an image signal obtained by reading an image of an original document with said reading means, utilizing the output signal obtained by reading said reference member with said reading means;
wherein said correcting means is adapted to correct the fluctuation in the image signal taking into account the difference detected by said detecting means.

9. An image reading apparatus according to claim 8, further comprising a light source for illuminating an image to be read by said reading means.

10. An image reading apparatus according to claim 8, further comprising storage means for storing the output signal obtained by reading said reference member with said reading means, and wherein said correcting means corrects the fluctuation store din said storage means.

11. An image reading apparatus according to claim 8, wherein said correcting means comprises memory means for outputting a corrected image signal in response to addressing the output signal of said reading means obtained by reading said reference member, and by the output signal obtained by reading an image of the original document.

12. An image reading apparatus according to claim 8, wherein the reference value is an output value obtained by reading a reference document of a predetermined reference density by said reading means.

13. An image reading apparatus according to claim 11, wherein data for correcting fluctuations are stored in said memory means and are determined by taking into account the difference detected by said detecting means.

14. An image reading apparatus according to claim 12, wherein the reference document comprises a pure white paper.

15. An image reading apparatus comprising:
reading means for photoelectrically reading an image and generating an image signal;
illuminating means for illuminating an image to be read;
a reference member for use in the measurement of the light intensity of said illuminating means;
determining means for determining the light intensity of said illuminating means so that an output value of said reading means obtained by reading a reference document is equal to a predetermined level;
detecting means for detecting the output value of said reading means obtained by reading said reference member illuminated by said illuminating means at a light intensity determined by said determining means; and
control means for controlling the light intensity of said illuminating means for reading an image of an original document in such a manner that the output value of said reading means obtained by reading said reference member becomes equal to the output value detected by said detecting means.

16. An image reading apparatus according to claim 15, further comprising memory means for storing the output value detected by said detecting means.

17. An image reading apparatus according to claim 15, further comprising means for increasing or decreasing the output value detected by said detecting means.

18. An image reading apparatus according to claim 15, wherein the reference document comprises a pure white paper.

19. An image reading apparatus according to claim 15, wherein said determining means comprises storage means for storing the determined light intensity.

20. An image reading apparatus according to claim 15, wherein said reference member is also used in the measurement of the fluctuation in the output of said reading means.

21. An image reading apparatus according to claim 20, further comprising correcting means for correcting the fluctuation of an image signal obtained by reading an image of the original document with said reading means, utilizing the output signal obtained by reading said reference member with said reading means.

* * * * *

UNITED STATES PATENT AND TRADEMARK OFFICE
CERTIFICATE OF CORRECTION

PATENT NO. : 4,888,492

DATED : December 19, 1989

INVENTOR(S) : Shinobu Arimoto

It is certified that error appears in the above-identified patent and that said Letters Patent is hereby corrected as shown below:

[54] Title:

"IMAGE READING APPARATUS" should read --IMAGE READING APPARATUS PERFORMING SHADING CORRECTION IN ACCORDANCE WITH THE DENSITY CHANGE OF THE REFERENCE MEMBER--.

FIGURE 2:

"CCD DRIVNG SIGNAL GEN." should read --CCD DRIVING SIGNAL GEN.--.

FIGURE 5:

"LIGHT REGULATION VALUE MESUREMENT SW INPUT" should read --LIGHT REGULATION VALUE MEASUREMENT SW INPUT--, and "LIGHT REGULATION VALUE MESUREMENT MODE" should read --LIGHT REGULATION VALUE MEASUREMENT MODE--.

FIGURE 15:

"DENSITY RATIO MESUREMENT SW INPUT" should read --DENSITY RATIO MEASUREMENT SW INPUT--, and "DENSITY RATIO MESUREMENT MODE" should read --DENSITY RATIO MEASUREMENT MODE--, and "DATA MESUREMENT" should read --DATA MEASUREMENT--.

UNITED STATES PATENT AND TRADEMARK OFFICE
CERTIFICATE OF CORRECTION

PATENT NO. : 4,888,492

DATED : December 19, 1989

INVENTOR(S) : Shinobu Arimoto

It is certified that error appears in the above-identified patent and that said Letters Patent is hereby corrected as shown below:

COLUMN 1:

Line 26, "and" (first occurrence) should be deleted.

Line 33, "luminocity" should read --luminosity--.

Line 65, "the" should be deleted.

COLUMN 3:

Line 61, "data the" should read --data of the--.

COLUMN 4:

Line 17, "a CPU from address bus 214" should read --a CPU address from address bus 214--.

COLUMN 6:

Line 20, "to determined" should read --to determine--.

UNITED STATES PATENT AND TRADEMARK OFFICE
CERTIFICATE OF CORRECTION

PATENT NO. : 4,888,492

DATED : December 19, 1989

INVENTOR(S) : Shinobu Arimoto

It is certified that error appears in the above-identified patent and that said Letters Patent is hereby corrected as shown below:

COLUMN 9:

Line 19, "a" (first occurrence) should be deleted.

Line 30, "FIG. 1, the" should read --FIG. 1. The--.

COLUMN 10:

Line 8, "In a without" should read --Without--.

Line 42, "light source 144" should read --light source 104--.

COLUMN 11:

Line 8, "consecutive eight pixels," should read --eight consecutive pixels--.

COLUMN 12:

Line 20, "pre-scan-" should read --prescan- --.

UNITED STATES PATENT AND TRADEMARK OFFICE
CERTIFICATE OF CORRECTION

PATENT NO. : 4,888,492

DATED : December 19, 1989

INVENTOR(S) : Shinobu Arimoto

It is certified that error appears in the above-identified patent and that said Letters Patent is hereby corrected as shown below:

COLUMN 16:

Line 68, "comprise" should read --comprises--.

COLUMN 17:

Line 11, "fluctuations" should read --fluctuations,--.

Line 41, "store din" should read --stored in--.

Signed and Sealed this

Second Day of October, 1990

Attest:

HARRY F. MANBECK, JR.

Attesting Officer

Commissioner of Patents and Trademarks